United States Patent
Yu et al.

(10) Patent No.: US 9,445,090 B2
(45) Date of Patent: Sep. 13, 2016

(54) EXPLICIT WAY FOR SIGNALING A COLLOCATED PICTURE FOR HIGH EFFICICENCY VIDEO CODING (HEVC) USING REFERENCE LIST0 AND LIST1

(71) Applicant: Google Technology Holdings LLC, Mountain View, CA (US)

(72) Inventors: Yue Yu, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 730 days.

(21) Appl. No.: 13/681,237

(22) Filed: Nov. 19, 2012

(65) Prior Publication Data

US 2013/0128969 A1 May 23, 2013

Related U.S. Application Data

(63) Continuation of application No. 13/680,531, filed on Nov. 19, 2012.

(60) Provisional application No. 61/561,270, filed on Nov. 18, 2011.

(51) Int. Cl.
*H04N 19/00* (2014.01)
*H04N 19/50* (2014.01)
(Continued)

(52) U.S. Cl.
CPC ...... *H04N 19/00569* (2013.01); *H04N 19/103* (2014.11); *H04N 19/174* (2014.11); *H04N 19/50* (2014.11); *H04N 19/577* (2014.11); *H04N 19/70* (2014.11)

(58) Field of Classification Search
CPC ............. H04N 19/174; H04N 19/107; H04N 19/172; H04N 19/503

USPC ......... 348/208.2, 222.1; 375/240.12, 240.13, 375/240.16
See application file for complete search history.

(56) References Cited

U.S. PATENT DOCUMENTS

| 7,970,058 B2 | 6/2011 | Suzuki |
| 9,094,689 B2 | 7/2015 | Yu et al. |

(Continued)

FOREIGN PATENT DOCUMENTS

| EP | 1422946 | 5/2004 |
| WO | WO2011050641 | 5/2011 |
| WO | WO2013116608 A1 | 8/2013 |

OTHER PUBLICATIONS

Bross B et al: "WD4: Working Draft 4 of High-Efficiency Video Coding", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ) ; URL: http://wftp3.itu.int/av-arch/jctvc-site/,, No. JCTVC-F803. Sep. 8, 2011 XP838889888.

(Continued)

*Primary Examiner* — Jeffery Williams
(74) *Attorney, Agent, or Firm* — Young Basile Hanlon & MacFarlane, P.C.

(57) ABSTRACT

A system is provided for determining a collocated reference picture to enable encoding and decoding of a current picture for high efficiency video coding (HEVC). The collocated picture is identified by accessing syntax that can include an index for a list0 and a list1, a reference picture set number indicating the number of pictures in list0 and list1, and a flag indicating if the collocated picture is in list0 or list1. The system can further use slice type to determine if both list0 and list1 should be accessed.

14 Claims, 8 Drawing Sheets

(51) Int. Cl.
*H04N 19/70* (2014.01)
*H04N 19/103* (2014.01)
*H04N 19/174* (2014.01)
*H04N 19/577* (2014.01)

(56) References Cited

U.S. PATENT DOCUMENTS

| | | | |
|---|---|---|---|
| 9,185,408 | B2 | 11/2015 | Yu et al. |
| 2003/0058238 | A1 | 3/2003 | Doak et al. |
| 2003/0107815 | A1 | 6/2003 | Redmond |
| 2005/0013365 | A1 | 1/2005 | Mukerjee et al. |
| 2005/0046702 | A1* | 3/2005 | Katayama et al. ........ 348/222.1 |
| 2005/0053137 | A1 | 3/2005 | Holcomb |
| 2005/0117646 | A1 | 6/2005 | Joch et al. |
| 2005/0152452 | A1* | 7/2005 | Suzuki ..................... 375/240.16 |
| 2005/0232356 | A1 | 10/2005 | Gomi et al. |
| 2005/0265452 | A1 | 12/2005 | Miao et al. |
| 2005/0276448 | A1 | 12/2005 | Pryor |
| 2006/0104349 | A1 | 5/2006 | Joch et al. |
| 2006/0219857 | A1 | 10/2006 | Satterfield |
| 2006/0233252 | A1 | 10/2006 | Bhattacharya et al. |
| 2007/0063997 | A1 | 3/2007 | Scherer et al. |
| 2007/0286281 | A1 | 12/2007 | Tsuchiya et al. |
| 2008/0136923 | A1* | 6/2008 | Inbar et al. ................. 348/208.2 |
| 2008/0175565 | A1 | 7/2008 | Takakura et al. |
| 2008/0267290 | A1* | 10/2008 | Barbieri et al. ......... 375/240.13 |
| 2009/0003446 | A1* | 1/2009 | Wu et al. ................. 375/240.16 |
| 2009/0021588 | A1 | 1/2009 | Border et al. |
| 2009/0080535 | A1 | 3/2009 | Yin et al. |
| 2009/0087111 | A1 | 4/2009 | Noda et al. |
| 2009/0129472 | A1 | 5/2009 | Panusopone et al. |
| 2009/0168886 | A1* | 7/2009 | Ikeda et al. .............. 375/240.16 |
| 2010/0098162 | A1 | 4/2010 | Lu et al. |
| 2010/0111182 | A1 | 5/2010 | Karczewicz et al. |
| 2010/0128995 | A1 | 5/2010 | Drugeon et al. |
| 2011/0002389 | A1 | 1/2011 | Xu et al. |
| 2011/0110428 | A1 | 5/2011 | Chang et al. |
| 2011/0228852 | A1 | 9/2011 | Budagavi |
| 2012/0082229 | A1 | 4/2012 | Su et al. |
| 2012/0169923 | A1 | 7/2012 | Millar et al. |
| 2012/0236942 | A1 | 9/2012 | Lin et al. |
| 2012/0250773 | A1 | 10/2012 | Chien et al. |
| 2013/0128967 | A1 | 5/2013 | Yu et al. |
| 2013/0128970 | A1 | 5/2013 | Yu et al. |
| 2013/0128977 | A1 | 5/2013 | Yu et al. |
| 2013/0163663 | A1 | 6/2013 | Yu et al. |
| 2013/0182769 | A1 | 7/2013 | Yu et al. |
| 2013/0202034 | A1 | 8/2013 | Yu et al. |
| 2013/0242046 | A1 | 9/2013 | Zhang et al. |
| 2013/0272375 | A1 | 10/2013 | Yu et al. |
| 2013/0272406 | A1 | 10/2013 | Yu et al. |
| 2014/0023142 | A1 | 1/2014 | Yu et al. |
| 2014/0056356 | A1 | 2/2014 | Yu et al. |

OTHER PUBLICATIONS

Yu Y et al: "Simplification of MVP Design for HEVC", 6. JCT-VC Meeting; 97. MPEG Meeting; Jul. 14, 2011-Jul. 22, 2011; Torino; (Joint Collaborative Team on Video' Coding of ISO/IEC JTCI/SC29/WGII and ITU-TSG.16 ); URL: http://wftp3.itu.int/av-arch/jctvc-site/,, No. JCTVC-F575, Jul. 19, 2011, XP030009598.

Yu Vue et al: "The Reference Picture Construction of Combined List for HEVC ", 7. JCT-VC Meeting; 98. MPEG Meeting; Nov. 21, 2011-Nov. 30, 2011; Geneva; (Joint Collaborative Team on Video Coding of ISO/IEC JTCI/SC29/WGII and ITU-T SG.16 ); URL: http://wftp3.itu.int/av-arch/jctvc-site/,, No. JCTVC-G717, Nov. 10, 2011.

Fang S et al: "The Construction of Combined List for HEVC", 6. JCT-VC Meeting; 97. MPEG Meeting; Jul. 14, 2011-Jul. 22, 2011; Torino; (Joint Collaborative Team on Video Coding of ISO/IEC JTCI/SC29/WGII and ITU-T SG;16 ); URL: http://wftp3.itu.int/av-arch/jctvc-site/ No. JCTVC-F573, Jul. 16, 2011.

Toshiyasu Sugio et al: I"CE9: Experiment A, I, J and S Modified derivation process of reference index for skip mode and temporal motion vector predictor", Mar. 18, 2011, No. JCTVC-E230, Mar. 18, 2011 (Mar. 10, 2011).

J-L Lin et al: "Improved Advanced Motion Vector Prediction", 4. JCT-VC Meeting; 95. MPEG Meeting; Jan. 20, 2011-Jan. 28, 2011; Daegu;(Joint Collaborative Team on Video Coding of ISO/IEC JTCI/SC29/WG11and ITU-T SG.16 ); URL: http://wftp3.itu.int/av-arch/jctvc-site/ •• No. JCTVC-Dl25. Jan. 15, 2011. XP030008165.

Jian-Liang Lin et al: "Motion vector coding techniques for HEVC", Multimedia Signal Processing (MMSP). 2011 IEEE 13th International Workshop on. IEEE. Oct. 17, 2011. pp. 1-6. XP03202755.

Byeong-Moon Jeon. Alexis Michael Tourapis: "B pictures in JVT". 4. JVT Meeting; 61. MPEG Meeting; Jul. 22, 2002-Jul. 26, 2002; Klagenfurt.AT; (Joint Video Team of ISO/IEC JTCI/SC29/WGII and ITU-T SG.16 ), No. JVT-DI55. Jul. 26, 2002, XP030005418.

Patent Cooperation Treaty, International Search Report and Written Opinion of the International Searching Authority for International Application No. PCT/US2012/065850, Feb. 27, 2013, 17 pages.

Patent Cooperation Treaty, "PCT Search Report and Written Opinion of the International Searching Authority" for International Application No. PCT/US2012/066146 dated Feb. 20, 2013, 15 pages.

I-K Kim et al: "Restriction on motion vector scaling for Merge and AMVP", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/ No. JCTVC-G551, Nov. 8, 2011, XP030110535.

Sjaberg R et al: "Absolute signaling of reference pictures", 6. JCT-VC Meeting; 97. MPEG Meeting; Jul. 14, 2011-Jul. 22, 2011; Torino; (Joint Collaborative Team on Video Coding of ISO/IEC JTCI/SC29/WG11 and ITU-T SG.16 ); URL: http://wftp3.itu.int/av-arch/jctvc-site/ No. JCTVC-F493, Jul. 22, 2011, XP030009516.

Yu Y et al: "Implicit Signaling of collocated picture for HEVC", 99. MPEG Meeting; Jun. 2, 2012-Oct. 2, 2012; San Josa CR ; (Motion Picture Expert Group or ISO/IEC JTCI/SC29/WG11) No. m23429, Jun. 7, 2012, XP030051954.

Yu Y et al: "Modifications on signaling collocated picture", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-I0266, Apr. 17, 2012, XP030112029.

Yu Y et al: "AHG21: The Improvements on Reference Picture Buffering and List Construction", 7. JCT-VC Meeting; 98. MPEG Meeting; Nov. 21, 2011-Nov. 30, 2011; Geneva; (Joint Collaborative Team on Video Coding of ISO/IEC JTCI/SC29/WG11 and ITU-T SG.16 ); URL: http://wftp3.itu.int/av-arch/jctvc-site/,, No. JCTVC-G717, Nov. 10, 2011, XP030110701.

Bross B et al: "High Efficiency Video Coding (HEVC) text specification draft 6", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H1003, Feb. 10, 2012, all pages.

Bross, Benjamin et al.: "High Efficiency Video Coding (HEVC) text specification draft 7," Joint Collaborative Team on Video Coding(JCT-VC) of ISO/IEC JTC1/SC29/WG11 and ITU-T SG16 WP3, 9th Meeting : Geneva, CH, Apr. 27, 2007 May 2012, JCTVC-I1003_d9, 278 pages.

Guillaume Laroche et al.: "On memory compression for motion vector prediction", Mar. 10, 2011, No. JCTVC0E221, Mar. 10, 2011 all pages.

Hellman T et al.: "Limiting Collocated Temporal Reference to One Per Picture", Joint Collabortive Team on Video Coding of ISO/IEC JTC1/SC29/WG11 and ITU-T SG. 16, No. JCTVC-H0442, Jan. 20, 2012, JCT-VC Meeting; 99, MPEG Meeting; Feb. 1, 2012-Feb. 10, 2012; San Jose Retrieved from the Internet: URL: http://wftp3.itu.int/av-arch/jctvc-site/[retrieved on May 23, 2013], all pages.

IPRP, & Written Opinion of the International Searching Authority for International Application No. PCT/US2013054965, Feb. 15, 2015, 8 pages.

(56) References Cited

OTHER PUBLICATIONS

ISR & Written Opinion Re: application PCTUS2012070871 dated Mar. 19, 2013, 15 pages.
ISR, "ISR Search Report and Written Opinion of the International Searching Authority" for International Application No. ISR/US2013055968 dated Nov. 22, 2013 , 9 pages.
ISR, & Written Opinion of the International Searching Authority fo International Application No. ISR/US2012/065699, Jan. 25 , 16 Pages.
ISR, & Written Opinion of the International Searching Authority for International Application No. ISR/US2013024294, Jul. 3, 2013, 13 pages.
ISR, & Written Opinion of the International Searching Authority for International Application No. ISR/US2013025988, May 14, 2013, 11 pages.
ISR, & Written Opinion of the International Searching Authority for International Application No. ISR/US2013025994, May 15, 2013, 12 pages.
ISR, & Written Opinion of the International Searching Authority for International Application No. ISR/US2013054965, Oct. 22, 2013, 12 pages.
J-L Lin et al.: "Syntax for AMVP Parsing Error Control", 95. MPEG Meeting; Jan. 24, 2011-Jan. 28, 2011; Daegu; (Motion Picture Expert Group or ISO/IEC JTC1/SC29/WG11) No. m18878, Jan. 23, 2011, all pages.
Jung J et al.: Temporal MV predictor modification for MV-Comp, Skip Direct and Merge schemes', 4. JCT-VC Meeting; 95, MPEG Meeting; Jan. 20, 2011-Jan. 28, 2011; Daegu; (Joint Collaborative Team on Video Coding of ISO/IEC JCT1/SC29/WG11 and ITU-T SG16); URL; http://wftp.3.itu.int/av-arch/jctvc-site/, No. JCTVC-D164, Jan. 15, 2011, all pages.
Kadono: "Memory Reduction for Temporal Direct Mode", 5, JVT Meeting; Oct. 14, 2002-Oct. 18, 2002; Geneva, CH; (Joint Video Team of ISC/IEC JTC1/SC29/WG11 and ITU-T SG16), No. JVT-E076, Oct. 18, 2002, all pages.
Li (USTC) B et al.: "High-level Syntax: Marking process for non-TMVP pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/,, No. JCTVC-G398, Nov. 8, 2011, all pages.
Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL: http://wftp3.itu.int/av-arch/jctvc-site/,, No. JCTVC-D139, Jan. 15, 2011, all pages.
Li et al.,"Redundancy reduction in B-Frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.
Lim C S et al.: "High-level Syntax: Proposed fix on signalling of TMVP disabling flag", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-10420, Apr. 17, 2012, all pages.
Philippe Bordes et al.: "AHG9: Simplification of weighted prediction signaling in PPS," 10. JCT-VC Meeting; 101. Mpeg Meeting; Jul. 11, 2012-Jul. 20, 2012; Stockholm; (Joint Collaborative Team on Video Coding of ISO/IEC JTC1/SC29/WG11 and ITU-T SG16); URL: http://wftp3.itu.int/av-arch/jctvc-site/. No. JCTVC-J0504, Jul. 12, 2012, all pages.
Suzuki et al., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu. Lorea; JCTVC-D421 Jan. 20-28, 2011; 8 pages.
Wahadaniah V et al.: "AHG14/AHG15/non-CE9: Loss robustness issue in TMVP disabling", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG. 16); URL: http://wftp3.itu.int/av-arch/jctvc-site/,, No. JCTVC-H0570, Jan. 21, 2012, all pages.
W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16),, URL: http://wftp3.itu.int/av-arch/jctvc-site/,, No. JCTVC-G680, Nov. 9, 2011, all pages.
Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G334, Nov. 9, 2011, all pages.
Yue Yu et al.: "Modification of slice temporal mvp enable flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG. 16); URL: http://wftp3.itu.int/av-arch/jctvc-site/,, No. JCTVC-K0251, Oct. 2, 2012, all pages.
European Office Action for EP128140860 mailed Oct. 20, 2015, 10 pages.
Bross B et al.: "High Efficiency Video (HEVC) text specification Working Draft 5", 7. JCT-VC Meeting; 98, MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/, No. JCTVC-G1103, Dec. 19, 2011, all pages.
Bankoski et al. "Technical Overview of VP8, An Open Source Video CODEC for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
IPRP and Written Opinion of the International Searching Authority for International Application No. PCT/US2013025988 mailed Oct. 23, 2014.
IPRP and Written Opinion of the International Searching Authority for International Application No. PCT/US2013025994 mailed Oct. 14, 2014.
IPRP for PCT/US2013/055968 from related application mailed Feb. 24, 2015.
Mozilla, "Introduction to Video Coding Part 1: Transform Coding", Video Compression Overview, Mar. 2012, 171 pp.
Overview; VP7 Data Format and Decoder. Version 1.5. On2 Technologies, IxNC. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

(56) References Cited

OTHER PUBLICATIONS

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

Bin Li et al., "Redundancy Reduction in B-Frame Coding at Temporal Level Zero," JCTVC-C278, Oct. 7, 2010, 6 pages.

Ericsson, "Absolute signaling of reference pictures," JCTVC-F493 WG11 No. m20923, JCT-VC of ITU-T SG16 WP3 and ISO/IEC JTC1/SC29/WG11, 6th (JCTVCF493) Meeting: Torino (2011) 16 pages.

Korean Office Action dated Aug. 12, 2015 in related matter. 11 pages.KR10-214-7013280, 17 pages.

Motorola Mobility, "The Construction of Combined List for HEVC," JCTVC-F573-r2, JCT-VC of ITU-T SG16 WP3 and ISO/IEC JTC1/SC29/WG11, 6th (JCTVCF573) Meeting: Torino, IT (Jul. 14-22, 2011), 6 pages.

Office Action in a related matter. Korean Patent Application No. 10-2014-7017195, mailed Jul. 30, 2015 7 pages.

Samsung Electronics Co., Ltd., "Restriction on motion vector scaling for Merge and AMVP," JCTVC-G551, JCT-VC of ITU-T SG16 WP3 and ISO/IEC JTC1/SC29/WG11, 7th (JCTVCG551) Meeting: Geneva, CH (Nov. 21-30, 2011) 4 pages.

\* cited by examiner

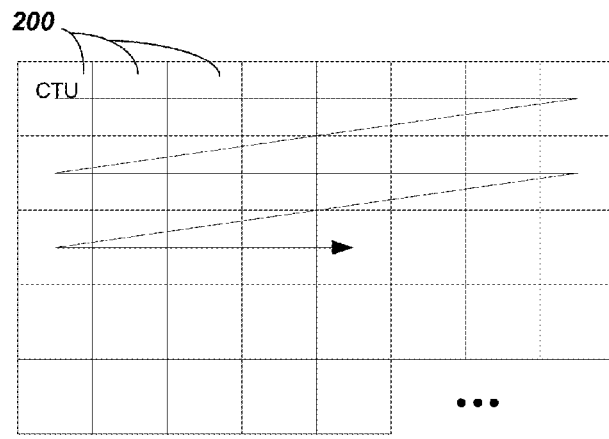
FIG. 2
*Prior Art*
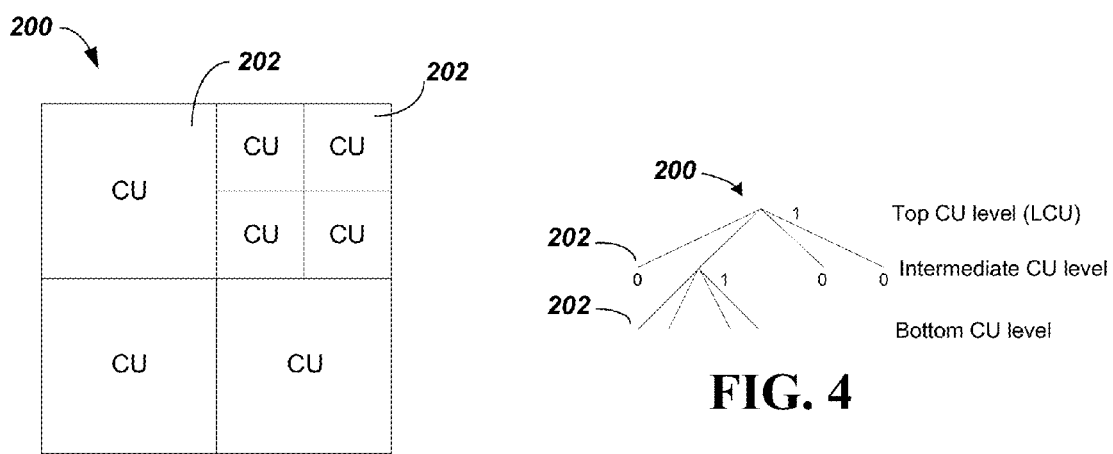
FIG. 3
*Prior Art*
FIG. 4
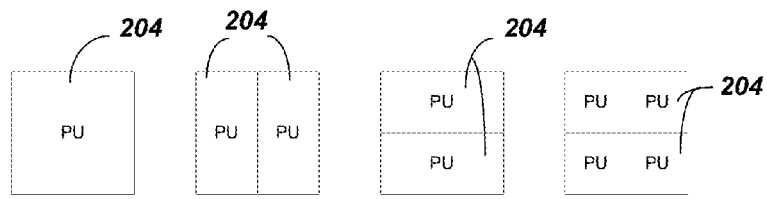
FIG. 5

Reference Picture Set Syntax

| ref_pic_set( idx ) { | Descriptor |
|---|---|
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| *   if(NumRpsCurr0>1) | |
| *       collocated_picture_idx_list0 | u(v) |
| *   if(NumRpsCurr1>1) | |
| *       collocated_picture_idx_list1 | u(v) |
| } | |

Slice Header Syntax

| | |
|---|---|
| slice_type | ue(v) |
| } | |
| if( slice_type == B ) | |
|   collocated_from_l0_flag | u(1) |
|   if(collocated_from_l0_flag ){ | |
|     If(NumRpsCurr0>1) | |
|       collocated_picture_idx | u(v) |
|   } | |
|   else{ | |
|     If(NumRpsCurr1>1) | |
|       collocated_picture_idx | u(v) |
|   } | |

FIG. 12

EXPLICIT WAY FOR SIGNALING A COLLOCATED PICTURE FOR HIGH EFFICICENCY VIDEO CODING (HEVC) USING REFERENCE LIST0 AND LIST1

CROSS REFERENCE TO RELATED APPLICATIONS

This application claims priority under 35 U.S.C. §119(e) from earlier filed U.S. Provisional Application Ser. No. 61/561,270, filed Nov. 18, 2011, the entirety of which is incorporated herein by reference. This application is also a Continuation of U.S. patent application Ser. No. 13/680,531, filed Nov. 19, 2012, which is incorporated herein by reference.

BACKGROUND

1. Technical Field

The present disclosure relates to the field of video compression, particularly video compression using High Efficiency Video Coding (HEVC) that employ block processing.

2. Related Art

FIG. 1 depicts a content distribution system 100 comprising a coding system 110 and a decoding system 140 that can be used to transmit and receive HEVC data. In some embodiments, the coding system 110 can comprise an input interface 130, a controller 111, a counter 112, a frame memory 113, an encoding unit 114, a transmitter buffer 115 and an output interface 135. The decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random access memory and a read only memory.

Source pictures 120 supplied from, by way of a non-limiting example, a content provider can include a video sequence of frames including source pictures in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding units can be derived from the source pictures utilizing the controller 111. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the Coding Units based on a source picture. In response to the encoding control signal 124 from the controller 111, the encoding unit 114 can begin to read out the prepared Coding Units to a high-efficiency encoding process, such as a prediction coding process or a transform coding process which process the prepared Coding Units generating video compression data based on the source pictures associated with the Coding Units.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitter buffer 115 so the counter 112 can be incremented or decremented. The controller 111 can control the production of video packets produced by the encoding unit 114 on the basis of the occupied area information 126 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

In various embodiments, the coding system 110 can be incorporated or otherwise associated with a transcoder or an encoding apparatus at a headend and the decoding system 140 can be incorporated or otherwise associated with a downstream device, such as a mobile device, a set top box or a transcoder.

The coding system 110 and decoding system 140 can be utilized separately or together to encode and decode video data according to various coding formats, including High Efficiency Video Coding (HEVC). HEVC is a block based hybrid spatial and temporal predictive coding scheme. In HEVC, input images, such as video frames, can be divided into square blocks called Coding Tree Units (CTUs) 200, as shown in FIG. 2. CTUs 200 can each be as large as 128×128 pixels, unlike other coding schemes that break input images into macroblocks of 16×16 pixels. As shown in FIG. 3, each CTU 200 can be partitioned by splitting the CTU 200 into four Coding Units (CUs) 202. CUs 202 can be square blocks each a quarter size of the CTU 200. Each CU 202 can be further split into four smaller CUs 202 each a quarter size of the larger CU 202. By way of a non-limiting example, the CU 202 in the upper right corner of the CTU 200 depicted in FIG. 3 can be divided into four smaller CUs 202. In some embodiments, these smaller CUs 202 can be further split into even smaller sized quarters, and this process of splitting CUs 202 into smaller CUs 202 can be completed multiple times.

With higher and higher video data density, what is needed are ways to more efficiently, rapidly and accurately encode and decode individual pictures in a group of pictures for HEVC.

SUMMARY

Embodiments of the present invention provide an improved system for encoding and decoding a current picture in a group of pictures in HEVC using a collocated picture. In embodiments for the system, a collocated picture is one of a group of reference pictures in a video stream which enable encoding and decoding of the current picture. The collocated picture can provide a motion vector (MV) to be used as one of candidates for Motion Vector Picture (MVP) and merge/skip mode for the current picture. The collocated picture is located in a group of reference pictures that are in relative close proximity to the current picture, and can be identified using a reference picture index containing a first list, list0, and a second, list1, wherein list0 and list1 use picture order count (POC) to locate reference pictures relative to the current picture. Some embodiments use a flag to identify which of list0 and list1 are needed to identify the collocated picture. Some embodiments further use an indication if the slice-type to assist in identifying the collocated picture. Several different embodiments are summarized to follow.

In a first embodiment, both list0 and list1 are separately accessed to identify the collocated picture. In this embodiment, the number of pictures in each set referenced by list0 and list1 are first evaluated. List0 and list1 have syntax labeled collocated_picture_idx_list0 and collocated_picture_idx_list1. These number of picture reference sets are identified by syntax labeled NumRpsCurr0 and NumRpsCurr1. If the number for either list0 or list1 is greater than 1, then list0 or list1 can be consulted for identification of the collocated picture. If the number is equal to 1, then there is only one picture in the reference picture set and it provides the collocated picture. If the number is 0, then the set of reference pictures is empty. A flag can be accessed in one embodiment to indicate which of list0 or list1 contains the collocated picture, the flag having syntax labeled collocated_from_l0_flag. Further, the slice type can be accessed to determine if accessing both list0 and list1 is needed. For a B-type slice, both list0 and list1 will be needed.

In a second embodiment, a different procedure from the first embodiment is provided to more efficiently identify the collocated picture. In this embodiment, the slice type is first evaluated to determine if it is B-type or not to potentially eliminate the need to access both list0 and list1. Similarly the flag is next accessed to determine if the collocated picture will be found in list0 or list1 if the slice type is identified as B-type, and if the collocated picture will be found in list0 if the slice type is identified as P-type. Finally, the reference picture set is evaluated only for the list identified to determine if the set is empty, contains only one number which will by default be the collocated picture, or contains more than one number requiring consultation of a syntax, collocated_picture_idx, which combines list0 and list1 to identify the collocated picture.

A third embodiment provides a generic method of identifying the collocated picture that encompasses the first and second embodiments described above. The features of this third embodiment generally include: (1) identifying a current picture in a group of pictures for decoding or encoding; (2) providing syntax for identifying a collocated reference picture in the group of pictures; and (3) using the identified collocated picture to decode or encode the current picture.

BRIEF DESCRIPTION OF THE DRAWINGS

Further details of the present invention are explained with the help of the attached drawings in which:

FIG. 2 depicts an embodiment of an input image divided into Coding Tree Units;

FIG. 3 depicts an embodiment of a Coding Tree Unit divided into Coding Units;

FIG. 4 depicts a quadtree representation of a Coding Tree Unit divided into Coding Units;

FIG. 5 depicts possible exemplary arrangements of Prediction Units within a Coding Unit;

FIG. 12 provides a syntax listing illustrating another embodiment for identifying a collocated picture for use in decoding a current picture using a common reference picture list.

DETAILED DESCRIPTION

Figure 1:
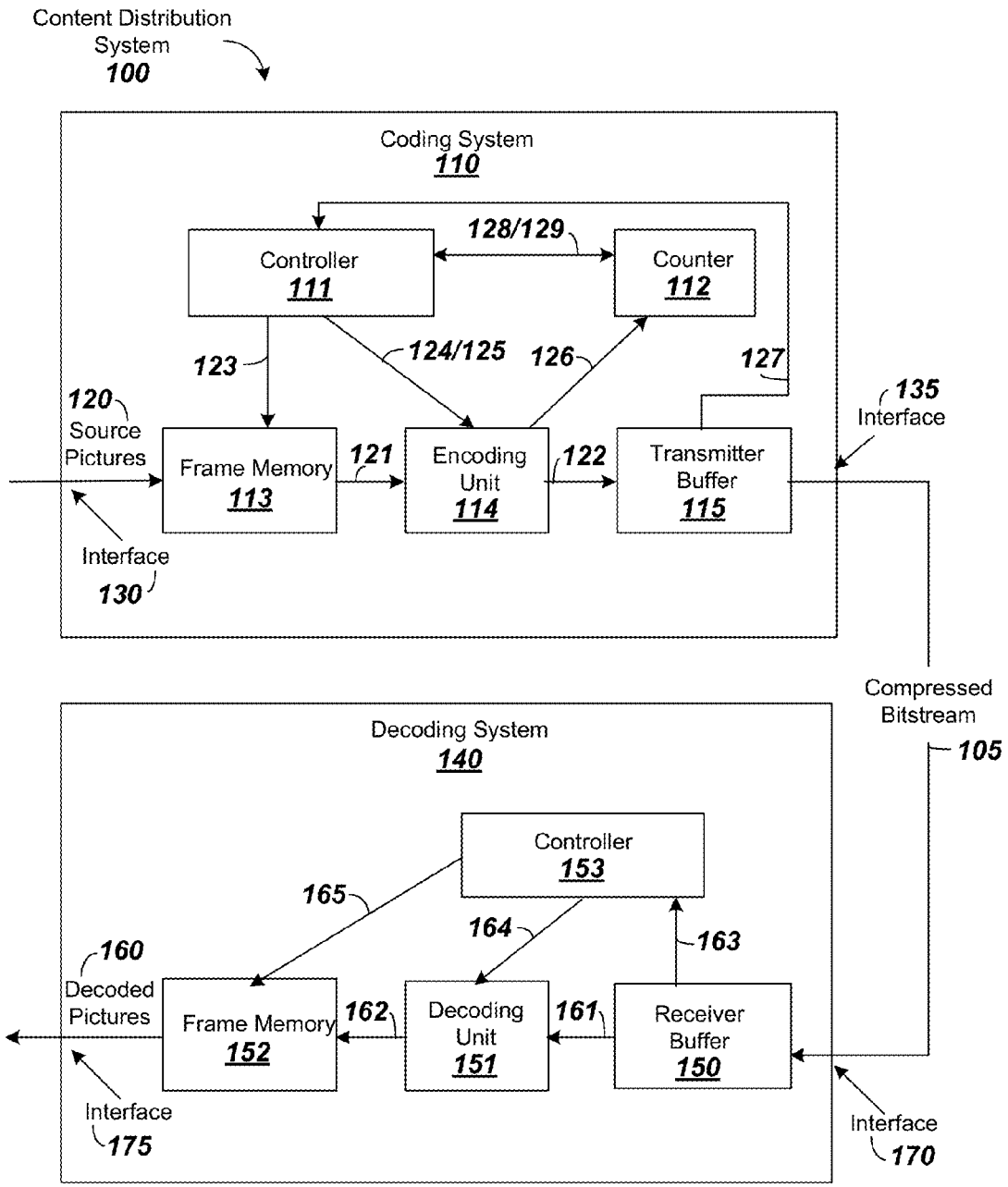
FIG. 1 depicts an embodiment of a content distribution system.

In HEVC, an input image, such as a video frame, is broken up into CUs that are then identified in code. The CUs are then further broken into sub-units that are coded as will be described subsequently.

Initially for the coding a quadtree data representation can be used to describe the partition of a CTU 200. The quadtree representation can have nodes corresponding to the CTU 200 and CUs 202. At each node of the quadtree representation, a flag "1" can be assigned if the CTU 200 or CU 202 is split into four CUs 202. If the node is not split into CUs 202, a flag "0" can be assigned. By way of a non-limiting example, the quadtree representation shown in FIG. 4 can describe the CTU partition shown in FIG. 3, in which the CTU 200 is split into four CUs 202, and the second CU 202 is split into four smaller CUs 202. The binary data representation of the quadtree can be a CU split flag that can be coded and transmitted as overhead, along with other data such as a skip mode flag, merge mode flag, and the PU coding mode described subsequently. By way of a non-limiting example, the CU split flag quadtree representation shown in FIG. 4 can be coded as the binary data representation "10100."

At each leaf of the quadtree, the final CUs 202 can be broken up into one or more blocks called prediction units (PUs) 204. PUs 204 can be square or rectangular. A CU 202 with dimensions of 2N×2N can have one of the four exemplary arrangements of PUs 204 shown in FIG. 5, with PUs 204 having dimensions of 2N×2N, 2N×N, N×2N, or N×N.

A PU can be obtained through spatial or temporal prediction. Temporal prediction is related to inter mode pictures. Spatial prediction relates to intra mode pictures. The PUs 204 of each CU 202 can, thus, be coded in either intra mode or inter mode. Features of coding relating to intra mode and inter mode pictures are described in the paragraphs to follow.

Intra mode coding can use data from the current input image, without referring to other images, to code an I picture. In intra mode the PUs 204 can be spatially predictive coded. Each PU 204 of a CU 202 can have its own spatial prediction direction. Spatial prediction directions can be horizontal, vertical, 45-degree diagonal, 135 degree diagonal, DC, planar, or any other direction. The spatial prediction direction for the PU 204 can be coded as a syntax element. In some embodiments, brightness information (Luma) and color information (Chroma) for the PU 204 can be predicted separately. In the HEVC, the number of Luma intra prediction modes for all block size is 35. In alternate embodiments, the number of Luma intra prediction modes for blocks of any size can be 35. An additional mode can be used for the Chroma intra prediction mode. In some embodiments, the Chroma prediction mode can be called "IntraFromLuma."

Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU 204 over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be syntax elements "MV," and the reference pictures can be syntax elements "refIdx." In some embodiments, inter mode can allow both spatial and temporal predictive coding.

Figure 6:
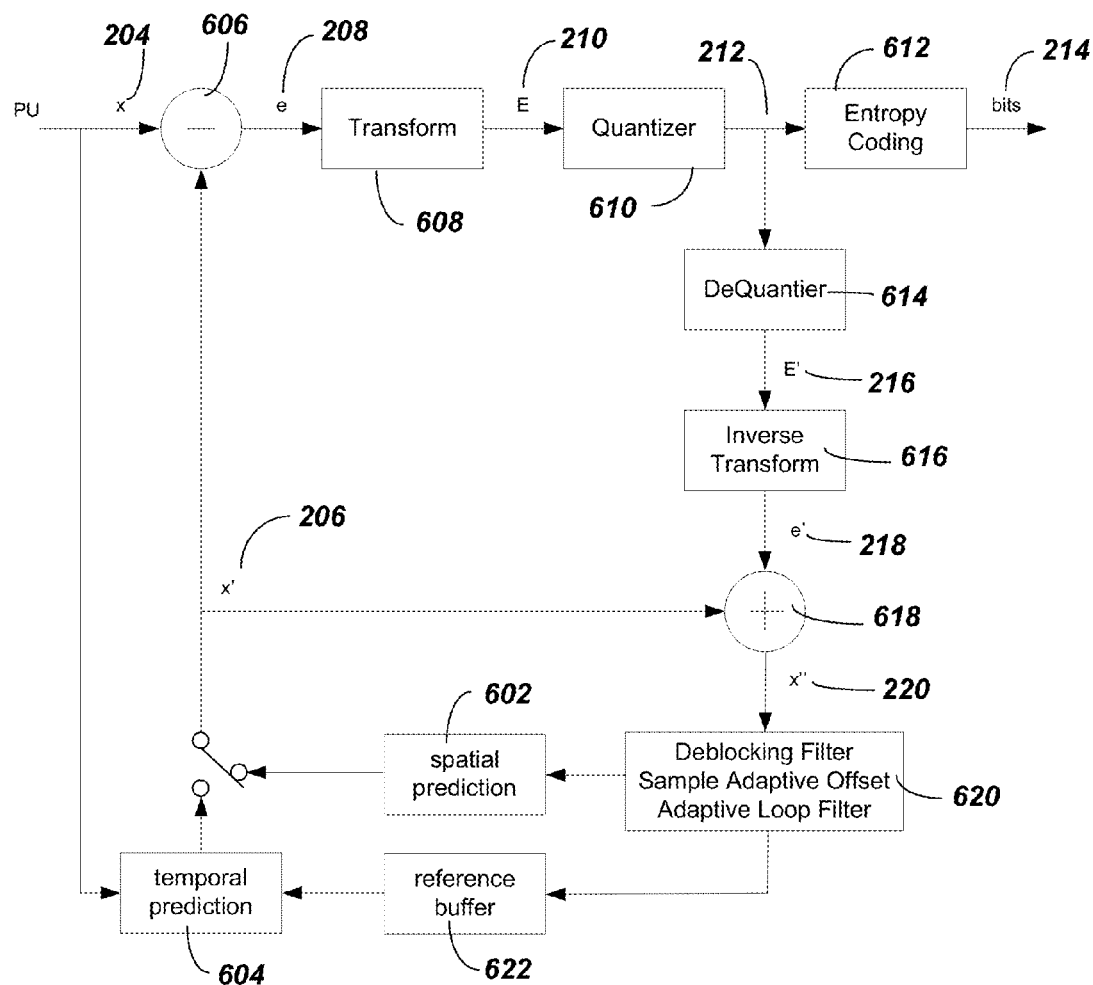
FIG. 6 depicts a block diagram of an embodiment of a method for encoding and/or decoding a Prediction Unit.

FIG. 6 depicts a block diagram of how a PU 204, x, can be encoded and/or decoded. At 606 a predicted PU 206, x', that is predicted by intra mode at 602 or inter mode at 604, as described above, can be subtracted from the current PU 204, x, to obtain a residual PU 208, e. At 608 the residual PU 208, e, can be transformed with a block transform into one or more transform units (TUs) 210, E. Each TU 210 can comprise one or more transform coefficients 212. In some embodiments, the block transform can be square. In alternate embodiments, the block transform can be non-square.

Figure 7:
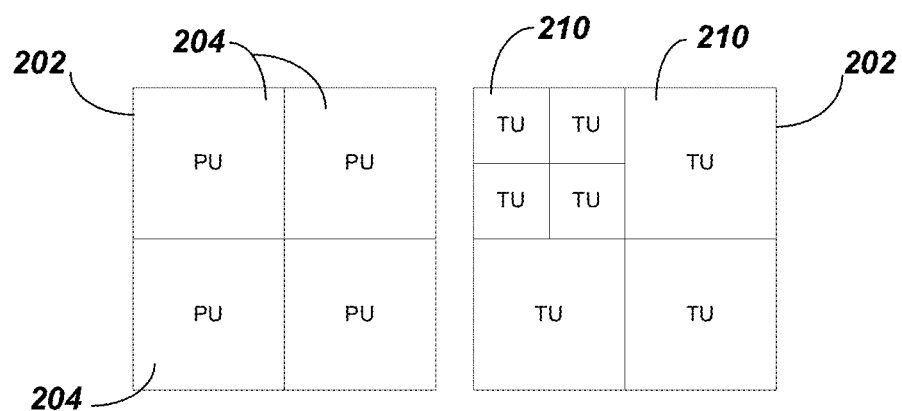
FIG. 7 depicts an exemplary embodiment of a Coding Unit divided into Prediction Units and Transform Units.
Figure 8:
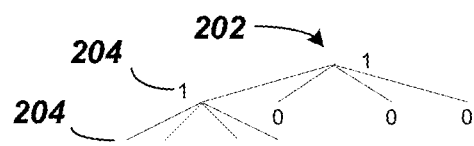
FIG. 8 depicts an exemplary embodiment of a quadtree representation of a Coding Unit divided into Transform Units.

As shown in FIG. 7, in HEVC, a set of block transforms of different sizes can be performed on a CU 202, such that some PUs 204 can be divided into smaller TUs 210 and other PUs 204 can have TUs 210 the same size as the PU 204. Division of CUs 202 and PUs 204 into TUs 210 can be shown by a quadtree representation. By way of a non-limiting example, the quadtree representation shown in FIG. 8 depicts the arrangement of TUs 210 within the CU 202 shown in FIG. 7.

Referring back to FIG. 6, at 610 the transform coefficients 212 of the TU 210, E, can be quantized into one of a finite number of possible values. In some embodiments, this is a lossy operation in which data lost by quantization may not be recoverable. After the transform coefficients 212 have been quantized, at 612 the quantized transform coefficients 212 can be entropy coded to obtain the final compression bits 214. Entropy coding schemes that can be applied during step 612 can include context-based adaptive binary arithmetic coding (CABAC) and context-adaptive variable-length coding CAVLC.

At 614 the quantized transform coefficients 212 can be dequantized into dequantized transform coefficients 216 E'. At 616 the dequantized transform coefficients 216 E' can then be inverse transformed to reconstruct the residual PU 218, e'. At 618 the reconstructed residual PU 218, e', can then be added to a corresponding prediction PU 206, x', obtained through either spatial prediction at 602 or temporal prediction at 604, to obtain a reconstructed PU 220, x". At 620 a deblocking filter can be used on reconstructed PUs 220, x", to reduce blocking artifacts. At 620 a sample adaptive offset process is also provided that can be conditionally performed to compensate the pixel value offset between reconstructed pixels and original pixels. Further, at 620, an adaptive loop filter can be conditionally used on the reconstructed PUs 220, x", to reduce or minimize coding distortion between input and output images.

If the reconstructed image is a reference image that will be used for future temporal prediction in inter mode coding, the reconstructed images can be stored in a reference buffer 622. An intra mode coded image can be a possible point where decoding can begin without needing additional reconstructed images.

Embodiments of the present invention provide advancements in the identification of reference pictures to assist in encoding and decoding of a current picture. In particular, identification of collocated reference picture is provided to enable more efficient encoding and decoding of the associated current picture. The collocated picture can be used as one of the candidates for Motion Vector Picture (MVP) and merge/skip mode for the current picture. Information about how collocated pictures are identified for current pictures is described for embodiments of the present invention to follow.

I. Overview—The Collocated Picture Identification in HEVC

In HEVC, an associated collocated reference picture for a current picture can reside in a preceding or subsequent picture that is being decoded or encoded. The collocated reference picture can be used as a candidate to enable MVP and merge/skip mode for the current picture.

The collocated picture provides a reference picture and in one method for identifying collocated picture when B type pictures are used can be specified in one of two lists, referred to as list0 or list1. A flag labeled collocated_from_l0_flag can be used to designate which one of the two lists, list0 or list1, identifies the collocated picture. The flag can be set to 1 to indicate that the picture shall be derived from list0, otherwise the picture shall be derived from list1. The default value of collocated_from_l0_flag is 1 if it is not present in the bitstream containing the group of pictures for encoding or decoding.

Specifically, the steps that can be used in a more conventional method to identify a collocated picture are provided below. In the steps, the flag collocated_from_l0_flag, as identified above, is used along with variables identifying list0 and list1, labeled RefPicList0[ ] and RefPicList1[ ]. An additional variable, colPic, identifies the collocated picture. The two steps (A) and (B) for the procedure are as follows:

(A) If slice_type is equal to B and collocated_from_l0_flag is equal to 0, the variable colPic specifies the picture that contains the co-located partition as specified by RefPicList1[0] which means that the first entry in the list1 is treated as collocated picture.

(B) Otherwise when the slice type is equal to B and collocated_from_l0_flag is equal to 1 or slice_type is equal to P, the variable colPic specifies the picture that contains the co-located partition as specified by RefPicList0[0] which means that the first entry in the list0 is treated as collocated picture.

The collocated picture is identified using this first "implicit" method as a first reference picture in either list0 or list1, depending upon the value of the flag, collocated_from_l0_flag. However, this implicit procedure for defining a collocated picture may not be optimal. Ideally, the collocated picture should be the closest reference picture to the current picture. But, the first reference picture in list0 or list1 may not necessarily be the one closest to the current picture. Moreover, RefPicList0[0] or RefPicList1[0] for different slices within a same picture may not point to a same collocated picture that will result in the difficulty of hardware implementation. Thus, it may be useful to provide alternative ways of signaling the collocated picture.

II. Improved Explicit Collocated Picture Identification for HEVC

In order to have the flexibility to choose an optimal collocated picture, the collocated picture can be signaled explicitly, instead of implicitly. For explicit signaling, a syntax element is used to explicitly represent the collocated picture by using procedures including embodiments that may not use the first entry reference picture in list0 or list1, or alternatively references a picture to identify the collocated reference picture from a single list instead of two separate lists. Depending upon where the new syntax element is put to explicitly represent the collocated picture, one or two syntax elements may be needed for list0 and list1 or a single list that effectively removes the need to reference both list0 and list1 might alternatively be used in more efficient coding.

A. Explicit Syntax Using List0 and List1

In one embodiment method of explicitly identifying the collocated picture, an absolute picture order count (POC) difference is used to represent the reference picture. This method is implemented by using the POC and the difference between the current picture POC and a reference picture POC. The POC and delta POC are used to construct a reference picture set (RPS). The RPS is then used to create two lists list0 and list1 that identify a collocated picture that can be used to encode and decode a current picture. The method of this embodiment to identify a collocated picture can be performed using the syntax of FIG. 9.

Figures 9, 10:
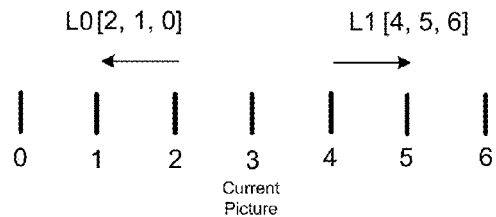
FIG. 9 provides a syntax listing illustrating one embodiment of the present invention for identifying a collocated reference picture for use in decoding a current picture using two reference picture lists, list0 and list1.
FIG. 10 illustrates a group of pictures for an explanation of how the difference in picture order count between a current picture and a reference picture is determined.

FIG. 9 begins by identifying a reference picture set index, ref_pic_set(idx), and identifying a number of negative and positive pictures for this reference picture set. The syntax variables for identifying the number of negative and positive variables, which are identical with the number of pictures in the list0 and list1, are num_negative_pics and num_positive_pics. The negative and positive pictures help to determine the pictures in list0 and list1 as can be explained with reference to FIG. 10. FIG. 10 illustrates a current picture 3 in a group of seven pictures with picture order count (POC) for the pictures ranging from 0 to 6. The negative pictures, or pictures that precede the current picture 3 include pictures 0-2. The positive pictures, or pictures that succeed the current picture 3 include pictures 4-6. As shown above the picture indicators, the negative pictures in list0 are represented as L0[2, 1, 0] in order after the current picture 3 where those numbers in the bracket are POC numbers of reference pictures in the list0 and, for example, the first entry of list0 is POC 2 and the second entry of list0 is POC 1 and so on. Similarly, the positive pictures in list1 are represented as L1[4, 5, 6] in order after the current picture 3. Keep in mind that pictures with POC 0, 1, 2, 4, 5 and 6 are encoded or decoded before picture 3.

The syntax of FIG. 9 continues by determining the difference between the current picture and a reference picture in the POC. This enables the list values for L0 and L1, shown in FIG. 10, to be converted to a more reasonable value by using difference coding. For example, with the syntax steps:

```
for(I = 0; I <num_negative_pics; i++)
    delta_poc_s0_minus1[i]
    used_by_current_pic_s0_flag[i]
``` these steps subtract the listed pictures from the current picture in the POC to convert list L0[2, 1, 0] to a new delta POC list L0[1, 2, 3] so that it is more easy to code delta POC instead of POC themselves. In the mean time, a further step sets a current picture by using the used_by_current_pic_s0_flag to indicate whether the picture in the reference list0 is used or not. Similarly, with the syntax steps:

```
for(I = 0; I <num_positive_pics; i++)
    delta_poc_s1_minus1 [i]
    used_by_current_pic_s1_flag[i]
``` these steps subtract the listed pictures from the current picture in POC to convert list L1[4, 5, 6] to a new delta POC list L1 [−1, −2, −3], and set a current picture by using used_by_current_pic_s1_flag to indicate whether the picture in the reference list1 is used or not.

FIG. 9 further includes significant syntax labeled with a "*". In this syntax, two variables are provided for the indexes for list0 and list1 in the reference picture set, ref_pic_set(idx), these variables being labeled collocated_picture_idx_list0 and collocated_picture_idx_list1 which specify the index for collocated picture in the list0 and list1, respectively. Further in this significant syntax, two variables for the number of current reference picture sets are provided labeled NumRpsCurr0, and NumRpsCurr1, that are also known as numbers of pictures for list0 and list1, respectively. The variables NumRpsCurr0 and NumRpsCurr1 identify the number of entries in the current reference picture sets, RefPicSetCurr0 and RefPicSetCurr1, respectively.

With this significant syntax in FIG. 9, the collocated picture is signaled explicitly in one of list0 and list1 by the collocated_picture_idx_list0 and collocated_picture_idx_list1, respectively. First in the significant syntax, the number of pictures in the current reference picture set for list0, NumRpsCurr0, is checked to determine if it is greater than 1. If NumRpsCurr0 is zero, nothing is in list0, and if NumRpsCurr0 is one, the one reference picture listed in the list0 has to be the collocated picture. If however, NumRpsCurr0 is greater than one, then the syntax, collocated_picture_idx_list0, is reviewed to determine which reference picture is designated as a collocated picture. If collocated_picture_idx_list0 is not present, it is inferred to be equal to 0.

Second in the significant syntax of FIG. 9, the number of pictures in the current reference picture set for list1, NumRpsCurr1, is checked to determine if it is greater than 1. If NumRpsCurr1 is zero, nothing is in list1, and if NumRpsCurr1 is one, the one reference picture listed in the list1 has to be the collocated picture. If however, NumRpsCurr1 is greater than one, then the syntax, collocated_picture_idx_list1, is reviewed to determine which reference picture is designated as the collocated picture. If collocated_picture_idx_list1 is not present, it is inferred to be equal to 0.

Although not shown in the syntax of FIG. 9, a separate flag can be provided to identify which of the two listings, list0 or list1, identifies the collocated picture. The variable for the flag which will have two states, 1 or 0, is collocated_from_l0_flag. If the collocated_from_l0_flag is equal to 1, the reference picture in list0 indicated by the collocated_picture_idx_list0 will be used for the collocated picture, otherwise, the reference picture in list1 indicated by the collocated_picture_idx_list1 will be used as the collocated picture.

For a slice/picture type other than B-type, the collocated_from_l0_flag is not present and will be set to 1 as a default value to indicate that list0 will be used by default. For B slice pictures, the collocated_from_l0_flag can have either a 0 or 1 value to indicate which of list0 or list1 will be used.

In practice, the method shown by the syntax of FIG. 9 may be implemented to select a picture from a set of pictures as a collocated picture reference for a current picture. Several examples are provided to follow.

In a first example using the syntax of FIG. 9, collocated_from_l0_flag is 1 and NumRpsCurr0 is 5. The delta POCs of reference pictures in the reference picture set, labeled RefPicSetCurr0, are {2, 5, 1, 4, 3}. If collocated_picture_idx_list0 is 2, the reference picture with delta POC as 1 from list0 will be used as the collocated picture for the current picture/slice.

In a second example, collocated_from_l0_flag is 0 and NumRpsCurr1 is 5. The delta POC of reference pictures in the RefPicSetCurr1 are {3, 1, 2, 4, 5}. If collocated_picture_idx_list1 is 1, the reference picture with delta POC as 1 from list1 will be used as the collocated picture for the current picture/slice.

Figure 11:
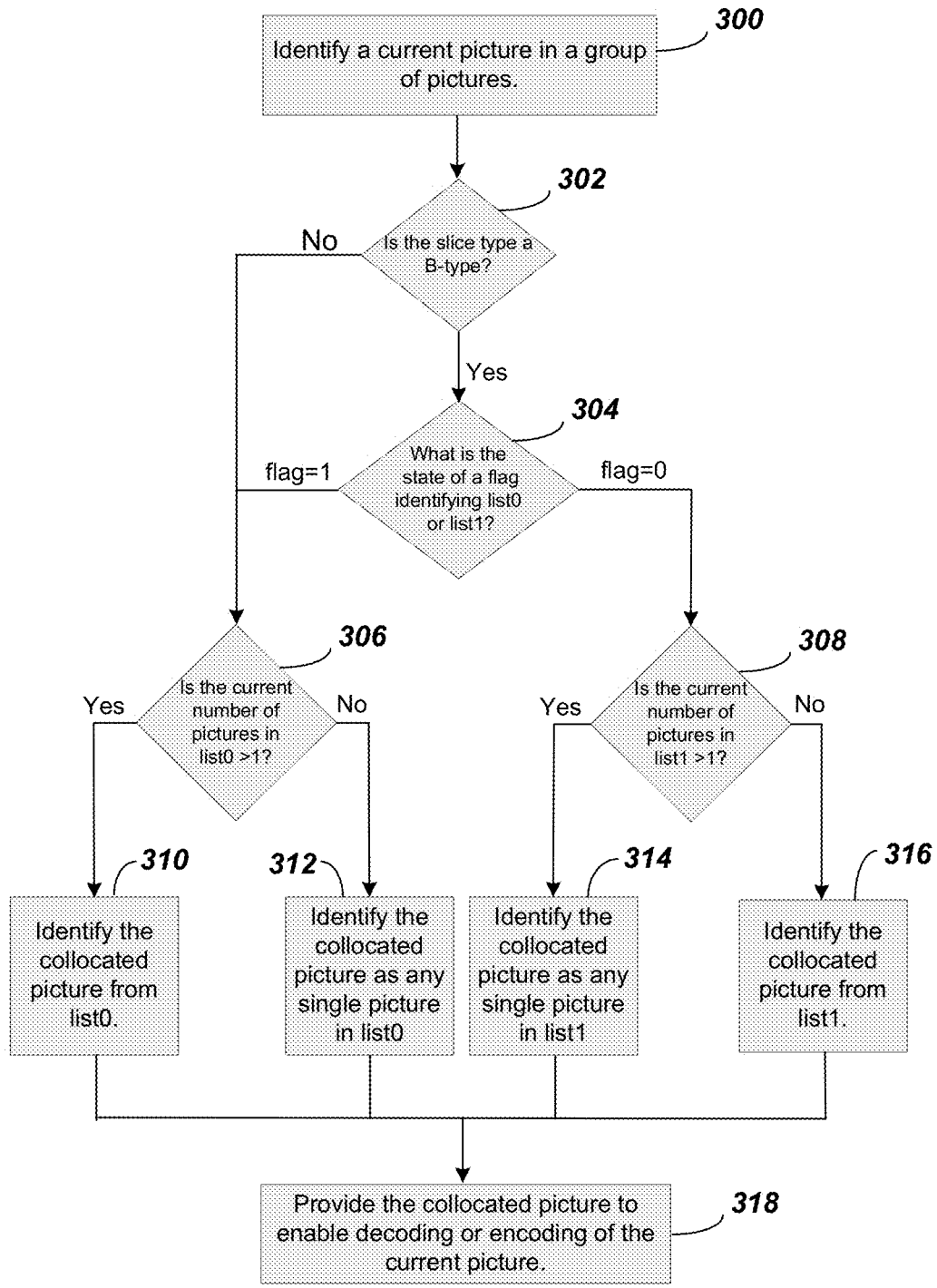
FIG. 11 provides a flow chart illustrating a compilation of syntax steps that can be used to identify a collocated picture to enable decoding and encoding of a current picture.

FIG. 11 provides a flow chart illustrating a compilation of syntax steps that can be used to identify a collocated picture to enable decoding and encoding of a current picture. First, in step 300 a current picture in a group of pictures identified for encoding or decoding is provided. In step 302, the slice type of the current picture is identified to determine if it is a B-type. If so a flag must be accessed in step 304 to determine if the collocated picture is identified in list0 or list1. If the picture is other than a B-type, the method proceeds directly to step 306 and assumes the listing with the collocated picture is list0. The determining step 304 is used, the flag state determines if the method proceeds to step 306 to examine list0 for the collocated picture, or if it proceeds to step 308 to examine list1.

If list0 is to be examined, step 306 looks to see if the current number of pictures in the list0 is greater than 1. If so, control proceeds to step 310 to identify the collocated picture from list0. If in step 306 the number of pictures is equal to one, the process proceeds to step 312 to identify the collocated picture as the only picture in list0.

If list1 is to be examined, step 308 looks to see if the current number of pictures in the list1 is greater than 1. If so, control proceeds to step 314 to identify the collocated picture from list1. If in step 308 the number of pictures is equal to one, the process proceeds to step 316 to identify the collocated picture as the only picture in list1.

Finally, once the collocated picture is identified, the method proceeds to step 318. Step 318 provides the collocated picture to enable encoding or decoding the current picture.

B. Explicit Syntax Using a Single Reference List

As an alternative to the process shown by the syntax of FIG. 9, one can use one syntax, collocated_picture_idx which specifies the index for collocated picture at either list0 or list1, at the slice header to explicitly signal the collocated picture for a current slice, as shown in the syntax listing of FIG. 12. This way also uses collocated_from_l0_flag to determine which of list0 or list1 is to be used prior to accessing the reference picture list. However, the syntax collocated_picture_idx may be put after collocated_from_l0_flag. With this ordering, there will be no need to have two syntaxes. The syntax of FIG. 12, thus, may provide a more efficient system than that of FIG. 9.

For the syntax of FIG. 12, initially the slice type is identified with syntax variable slice_type. If the slice type is B, then the flag, collocated_from_l0_flag is referenced to determine if the collocated picture will come from list0 or list1. For other slice types, the collocated_from_l0_flag is not present and the value of collocated_from_l0_flag is inferred to be equal to 1 that means that the collocated picture always comes from list0 and the "else" statement does not need to be checked. Similarly, if the collocated_from_l0_flag is 0, the "if" statement does not need to be checked.

Unlike the embodiment of FIG. 9, in FIG. 12 a single collocated_picture_idx is consulted that can identify the collocated picture. The flag can be set to 1 to indicate that the picture that contains a co-located partition shall be derived from the "if" syntax that examines pictures by using collocated_picture_idx from list0, otherwise the collocated picture shall be derived after the "else" statement from list1.

Similar to the embodiment of FIG. 9, in FIG. 12 two variables for the number of current reference picture sets are provided labeled NumRpsCurr0, and NumRpsCurr1. The variables NumRpsCurr0 and NumRpsCurr1, or number of reference pictures in the list0 and list1 respectively, identify the number of entries in the current reference picture sets. Thus in the syntax, the NumRpsCurr0 and NumRpsCurr1 are checked, depending on the "if" and "else" condition used to determine if it is greater than 1. If either are 0, then the set is empty and doesn't need to be evaluated. If either are 1, then the one index value identifies the collocated picture since it is the only one in the set, and that means the default value of collocated_picture_idx should be 0 and the collocated picture is the first and only picture in the corresponding reference list. If either are greater than 1, then the collocated_picture_idx syntax can be used to identify the collocated reference picture.

C. Explicit Collocated Picture with Efficient Syntax

The features common to both of the syntax for sections A and B above illustrate how an explicit method to identify a collocated picture can be performed. The syntax of section A uses more resources to identify the collocated picture. For example, searching through two separate lists, collocated_picture_idx_list0 and collocated_picture_idx_list1, must be performed to identify the collocated picture. By taking advance steps in the system of section B to eliminate a need to search through one of the lists by initially referencing a flag collocated_from_l0_flag, the syntax of section B eliminates resources required. Further, in Section B, the slice type is reviewed prior to even referencing the flag because if the slice type is I-type or P-type, and not B-type, the flag state will be known in advance.

Similar to the changes from syntax of section A to section B, other modifications of the syntax can be performed to make identification of the collocated picture more efficient. The common features of the syntax of sections A and B include: (1) identifying a current picture in a group of pictures for decoding or encoding; (2) providing syntax for identifying a collocated reference picture in the group of pictures; and (3) using the identified collocated picture to decode or encode the current picture.

Coding and encoding with the proposed syntax of FIGS. 9 and 12 may be performed in several ways. One possible way to code collocated_picture_idx_list0, collocated_picture_idx_list1, or collocated_picture_idx, is to use fixed length coding. The maximum bits used for these syntax is designated as a variable Ceil(Log 2(max_num_ref_frames), where max_num_ref_frames specifies the maximum number of reference frames, complementary reference field pairs, and non-paired reference fields that may be used by the decoding process for inter prediction of any picture in the sequence.

For actual encoding, various conditions apply. For example, if collocated_from_l0_flag is 1 and NumRpsCurr0 is also 1, neither collocated_picture_idx_list0 nor collocated_picture_idx is coded. Likewise, if collocated_from_l0_flag is 0 and NumRpsCurr1 is 1, neither collocated_picture_idx_list1 nor collocated_picture_idx is coded. Depending on the coding procedure, a process following the syntax coding rules for encoding can be used for decoding.

Figure 13:
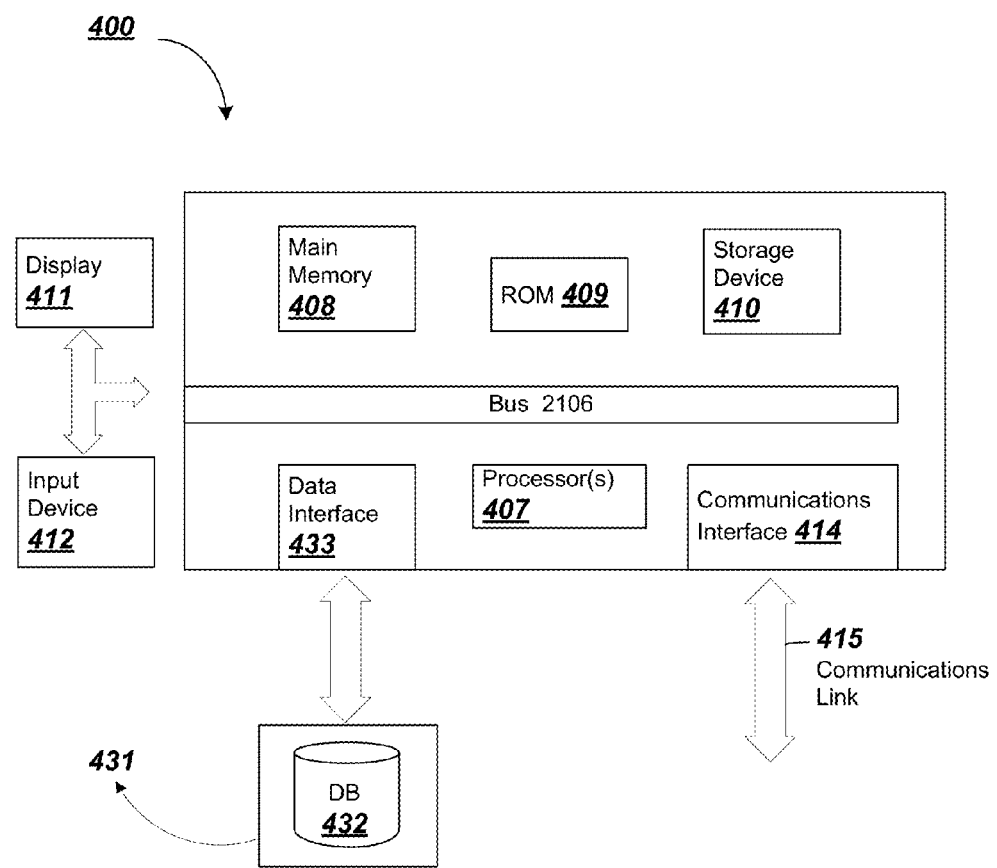
FIG. 13 depicts an exemplary embodiment of computer hardware that can be used to implement embodiments of the present invention.

The execution of the sequences of instructions required to practice the embodiments of the present invention may be performed by one or more computers in the system of FIG. 1. A computer system 400 that can be used will be described with reference to FIG. 13, which is a block diagram of the functional components of a computer system 400. As used herein, the term computer system 400 is broadly used to describe any computing device that can store and independently run one or more programs.

The computer system 400 can include a communication interface 414 coupled to the bus 406. The communication interface 414 provides two-way communication between computer systems 400. The communication interface 414 of a respective computer system 400 transmits and receives electrical, electromagnetic or optical signals that include data streams representing various types of signal information, e.g., instructions, messages and data. A communication link 415 links one computer system 400 with another computer system 400. For example, the communication link 415 may be a LAN, an integrated services digital network (ISDN) card, a modem, or the Internet.

A computer system 400 may transmit and receive messages, data, and instructions, including programs, i.e., application, code, through its respective communication link 415 and communication interface 414. Received program code may be executed by the respective processor(s) 407 as it is received, and/or stored in the storage device 410, or other associated non-volatile media, for later execution.

In an embodiment, the computer system 400 operates in conjunction with a data storage system 431, e.g., a data storage system 431 that contains a database 432 that is readily accessible by the computer system 400. The computer system 400 communicates with the data storage system 431 through a data interface 433.

Computer system 400 can include a bus 406 or other communication mechanism for communicating the instructions, messages and data, collectively, information, and one or more processors 407 coupled with the bus 406 for processing information. Computer system 400 also includes a main memory 408, such as a random access memory (RAM) or other dynamic storage device, coupled to the bus 406 for storing dynamic data and instructions to be executed by the processor(s) 407. The computer system 400 can further include a read only memory (ROM) 409 or other static storage device coupled to the bus 406 for storing static data and instructions for the processor(s) 407. A storage device 410, such as a magnetic disk or optical disk, may also be provided and coupled to the bus 406 for storing data and instructions for the processor(s) 407.

A computer system 400 may be coupled via the bus 406 to a display device 411, such as an LCD screen. An input device 412, e.g., alphanumeric and other keys, is coupled to the bus 406 for communicating information and command selections to the processor(s) 407.

According to one embodiment, an individual computer system 400 performs specific operations by their respective processor(s) 407 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 407 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed:

1. A method of identifying a collocated picture in a group of pictures provided in a video stream, the method comprising:
   providing a first reference picture set number as a number of reference pictures within a first reference picture set including all reference pictures that are prior to a current picture in decoding order;
   determining if the first reference picture set number is greater than 1, and if so providing a first collocated picture index for the first reference picture set, and if not, identifying the first entry of the first reference picture set as a candidate for a collocated picture that may be used in inter prediction of the current picture;
   providing a second reference picture set number as a number of reference pictures within a second reference picture set including all reference pictures that are after the current picture in decoding order; and
   determining if the second reference picture set number is greater than 1, and if so providing a second collocated picture index in the second reference picture set, and if not, identifying the first entry of the second reference picture set as a candidate for the collocated picture, wherein at least one of the first reference picture set or the second reference picture set identifies the collocated picture.

2. The method of claim 1, further comprising:
   determining from a state of a flag if the collocated picture is located using the first collocated picture index or the second collocated picture index.

3. The method of claim 1, further comprising:
   determining from a slice type if the collocated picture is located using either of the first collocated picture index or the second collocated picture index.

4. The method of claim 3, wherein when the slice type is B-type the collocated picture is located using either of the first collocated picture index or the second collocated picture index, but when the slice type is other type than B-type the collocated picture is located using only the first collocated picture index.

5. A decoder for processing a coded video stream that contains a group of pictures, the decoder comprising:
   a processor;
   a memory, communicatively coupled to the processor, the memory storing a plurality of instructions comprising instructions cause the processor to:
      provide a first reference picture set number for a number of reference pictures within a first reference picture set including all reference pictures that are prior to a current picture in decoding order;
      determine if the first reference picture set number is greater than 1, and if so provide a first collocated picture index for the first reference picture set, and if not, identify the first entry of the first reference picture set as a candidate for a collocated picture that may be used in inter prediction of the current picture;
      provide a second reference picture set number for a number of reference pictures within a second reference picture set including all reference pictures that are after the current picture in decoding order; and
      determine if the second reference picture set number is greater than 1, and if so provide a second collocated picture index in the second reference picture set, and if not, identify the first entry of the second reference picture set as a candidate for the collocated picture, wherein at least one of the first reference picture set or the second reference picture set identifies the collocated picture.

6. The decoder of claim 5, wherein the processor uses the collocated picture to decode the current picture.

7. The decoder of claim 5, wherein the instructions further cause the processor to:
   determine from a state of a flag if the collocated picture is located using the first collocated picture index or the second collocated picture index.

8. The decoder of claim 7, wherein the instructions further cause the processor to:
   determine from a slice type if the collocated picture is located using either of the first collocated picture index or the second collocated picture index.

9. The decoder of claim 5, wherein when the slice type is B-type the collocated picture is located using either of the first collocated picture index or the second collocated picture index, but when the slice type is another type than B-type the collocated picture is located only using the first collocated picture index.

10. An encoder for encoding a video stream containing a group of pictures, the encoder comprising:
    a processor;
    a memory, communicatively coupled to the processor, the memory storing a plurality of instructions comprising instructions that cause the processor to:
       provide a first reference picture set number for a number of reference pictures within a first reference picture set including all reference pictures that are prior to a current picture in decoding order;
       determine if the first reference picture set number is greater than 1, and if so provide a first collocated picture index for the first reference picture set, and if not, identify the first entry of the first reference picture set as a candidate for a collocated picture that may be used in inter prediction of the current picture;
       provide a second reference picture set number for a number of reference pictures within a second reference picture set including all reference pictures that are after the current picture in decoding order; and
       determine if the second reference picture set number is greater than 1, and if so provide a second collocated picture index in the reference picture set, and if not, identify the first entry of the second reference picture set as a candidate for the collocated picture, wherein at least one of the first reference picture set or the second reference picture set identifies the collocated picture.

11. The encoder of claim 10, wherein the processor uses the collocated picture to encode the current picture.

12. The encoder of claim 10, wherein the instructions further cause the processor to:
    determine from a state of a flag if the collocated picture is located using the first collocated picture index or the second collocated picture index.

13. The encoder of claim 12, wherein the instructions further cause the processor to:
  determine from a slice type if the collocated picture is located using either of the first collocated picture index or the second collocated picture index.

14. The encoder of claim 10, wherein when the slice type is B-type the collocated picture is located using either of the first collocated picture index or the second collocated picture index, but when the slice type is another type than B-type the collocated picture is located using only the first collocated picture index.

* * * * *